(12) United States Patent
Liu

(10) Patent No.: US 12,421,700 B1
(45) Date of Patent: Sep. 23, 2025

(54) SOLAR WATER VALVE WITH WATERPROOF STRUCTURE

(71) Applicant: Fanglin Liu, Chenzhou (CN)

(72) Inventor: Fanglin Liu, Chenzhou (CN)

( * ) Notice: Subject to any disclaimer, the term of this patent is extended or adjusted under 35 U.S.C. 154(b) by 0 days.

(21) Appl. No.: 19/206,596

(22) Filed: May 13, 2025

(51) Int. Cl.
  *E03B 7/07* (2006.01)
  *F16K 27/00* (2006.01)

(52) U.S. Cl.
  CPC ............. *E03B 7/075* (2013.01); *F16K 27/00* (2013.01); *Y10T 137/7062* (2015.04)

(58) Field of Classification Search
  CPC ... E03B 7/07; E03B 7/075; E03B 7/09; E03B 7/095; E03B 7/071; E03B 7/072; E03B 7/074; E03B 7/077; E03B 7/078; F16K 27/00; F16K 27/12; F16K 37/0058; H02S 30/10; Y10T 137/7036; Y10T 137/7043; Y10T 137/7047; Y10T 137/7058; Y10T 137/7062; Y10T 137/7065
  USPC ............ 137/375, 377, 378, 381, 382, 382.5; 251/129.01
  See application file for complete search history.

(56) References Cited

U.S. PATENT DOCUMENTS

| | | | | |
|---|---|---|---|---|
| 5,746,250 A | * | 5/1998 | Wick | A01G 25/165 239/69 |
| 6,412,515 B1 | * | 7/2002 | Hess | G01F 15/185 137/557 |
| 8,511,336 B1 | * | 8/2013 | Schumacher | F16K 27/12 137/364 |
| 10,959,385 B1 | * | 3/2021 | Chen | F16K 31/48 |
| 11,053,668 B1 | * | 7/2021 | Manning | E03B 7/003 |
| 2014/0196792 A1 | * | 7/2014 | Torres-Leon | A61M 39/223 137/1 |
| 2015/0040989 A1 | * | 2/2015 | Frontera-Mariani | G05D 7/0629 137/12 |
| 2017/0089047 A1 | * | 3/2017 | Kovscek | E03B 7/072 |
| 2020/0131745 A1 | * | 4/2020 | Maziel | E03B 7/072 |
| 2020/0305365 A1 | * | 10/2020 | Sherrill | A01G 25/16 |

* cited by examiner

*Primary Examiner* — Kenneth Rinehart
*Assistant Examiner* — Jonathan J Waddy
(74) *Attorney, Agent, or Firm* — JEEN IP LAW, LLC

(57) ABSTRACT

A solar water valve with a waterproof structure is provided, which includes a pipe body. An upper end of the pipe body is provided with an installation nut, a lower end of the pipe body is provided with an installation screw mouth, a surface of the pipe body is provided with a control valve. In the present disclosure, a protective front cover and a protective back cover form a tight waterproof structure through a sealing sleeve and a sealing ring, which are reinforced with a clamp block and provided with a rubber column, a stopper, and other sealing elements at a data connector to effectively prevent moisture from entering internal circuit components. Even in harsh environments such as humidity and rain, they can operate stably and extend the service life of the device. The solar panel converts light energy into electrical energy and stores it in a rechargeable battery.

9 Claims, 10 Drawing Sheets

SOLAR WATER VALVE WITH WATERPROOF STRUCTURE

TECHNICAL FIELD

The present disclosure relates to the field of water valve technologies, and in particular, to a solar water valve with waterproof structure.

BACKGROUND

A water valve is a device used to control water flow, usually installed in a water pipe system, to achieve opening, closing, and flow regulation of water flow through operations such as rotation, pulling, or pressing.

At present, most control water valves are equipped with batteries for power supply. When the battery runs out of power, it needs to be replaced, which affects the sealing of the water valve and is cumbersome to operate, thereby affecting a normal operation of the water valve. Therefore, a solar water valve with a waterproof structure is provided.

SUMMARY

In response to shortcomings of existing technology, the present disclosure provides a solar water valve with a waterproof structure, which solves the problem of most existing control water valves requiring regular maintenance and affecting their sealing performance.

To achieve the above objectives, the present disclosure is implemented through the following technical solution: a solar water valve with a waterproof structure, including a pipe body, where an upper end of the pipe body is provided with an installation nut, a lower end of the pipe body is provided with an installation screw mouth, one surface of the pipe body is provided with a control valve and a protective device, the protective device includes a protective back cover and a protective front cover; sides of the protective front cover and the protective back cover that are close to each other are both fixedly connected with a sealing sleeve, and the surface of the pipe body is fixedly connected to a sealing ring, and the sealing sleeve is fastened on the sealing ring; one side of the protective front cover close to the protective back cover is fixedly connected with a clamp block, and one side of the clamp block is inserted into the protective back cover, and an installation frame is fixedly connected to an inner wall of the protective front cover; a display screen is provided in the installation frame; one side of the display screen is electrically connected to a circuit board, and one side of the circuit board away from the display screen is electrically connected to a rechargeable battery; a solar panel is provided in the protective front cover, and an output end of the solar panel is electrically connected to an input end of the rechargeable battery; a driving end of the circuit board is electrically connected to an input end of the control valve.

This device provides three working modes: watering plan mode, manual mode, and delayed watering mode. It can flexibly manage watering plans, time settings, and other functions through button operations, and display real-time time, electricity, and water valve status.

In some embodiments of the present disclosure, a protective cover plate is provided on one side of the protective front cover away from the protective back cover, and a hook is fixedly connected to one surface of the protective cover plate; the surface of the protective front cover is provided with a clamp hole, and one side of the hook away from the protective cover plate is inserted into the clamp hole.

In some embodiments of the present disclosure, a button is provided in the protective front cover, a through hole is provided on the surface of the protective cover plate, one end of the button passes through the through hole, and a micro switch is electrically connected to one surface of the circuit board.

In summary, the technical effects and advantages of the present disclosure are as follows.

1. In the present disclosure, the protective front cover and protective rear cover form a tight waterproof structure by cooperating with a sealing ring through a sealing sleeve. The connection is reinforced with a clamp block and sealed with a rubber column, a stopper, and other sealing designs at the data connector, effectively preventing moisture from entering the internal circuit components. Even in harsh environments such as humidity and rain, the device can operate stably and extend its service life.
2. In the present disclosure, the solar panel converts light energy into electrical energy and stores it in a rechargeable battery, thereby providing continuous power to the circuit board and control valve without the need for an external power cord.

Numeral reference: 1. pipe body; 2. control valve; 3. installation screw mouth; 4. installation nut; 5. protective device; 51. protective back cover; 52. protective front cover; 53. protective cover plate; 54. button; 55. sealing sleeve; 56. sealing ring; 57. solar panel; 58. rechargeable battery; 59. circuit board; 510. micro switch; 511. display screen; 512. hook; 513. data connector; 514. through hole; 515. first limit frame; 516. baffle; 517. support column; 518. installation frame; 519. clamp hole; 520. positioning column; 521.

installation column; 522. support sleeve; 523. installation sleeve; 524. limit sleeve; 525. second limit frame; 526. protective ring; 527. positioning hole; 528. storage hole; 529. stopper; 530. rubber column; 531. sealing block; 532. sealing ring; 533. support plate; 534. clamp block; 6. cleaning device; 61. support block; 62. sliding rod; 63. positioning frame; 64. first magnet; 65. second magnet; 66. first load rod; 67. pull rod; 68. cleaning strip; 69. second load rod.

DESCRIPTION OF EMBODIMENTS

Below, the technical solutions in the embodiments of the present disclosure will be clearly and completely described in combination with the accompanying drawings. Obviously, the described embodiments are only a part of the embodiments of the present disclosure, not all of them. Based on the embodiments of the present disclosure, all other embodiments obtained by those skilled in the art without creative work are within the protection scope of the present disclosure.

Figure 1:
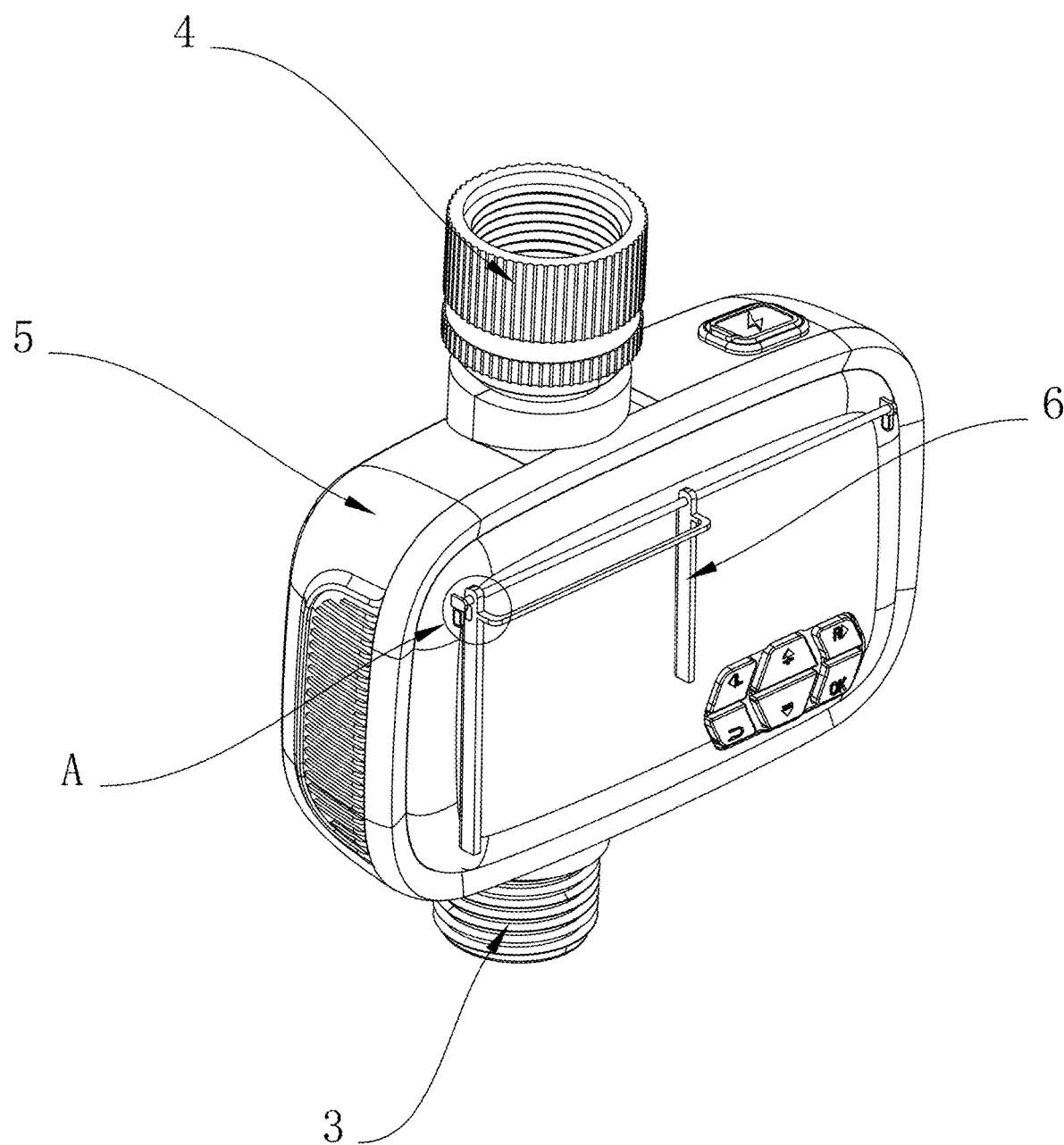
FIG. 1 is a schematic diagram of an overall structure of a solar water valve with a waterproof structure according to the present disclosure.
Figure 2:
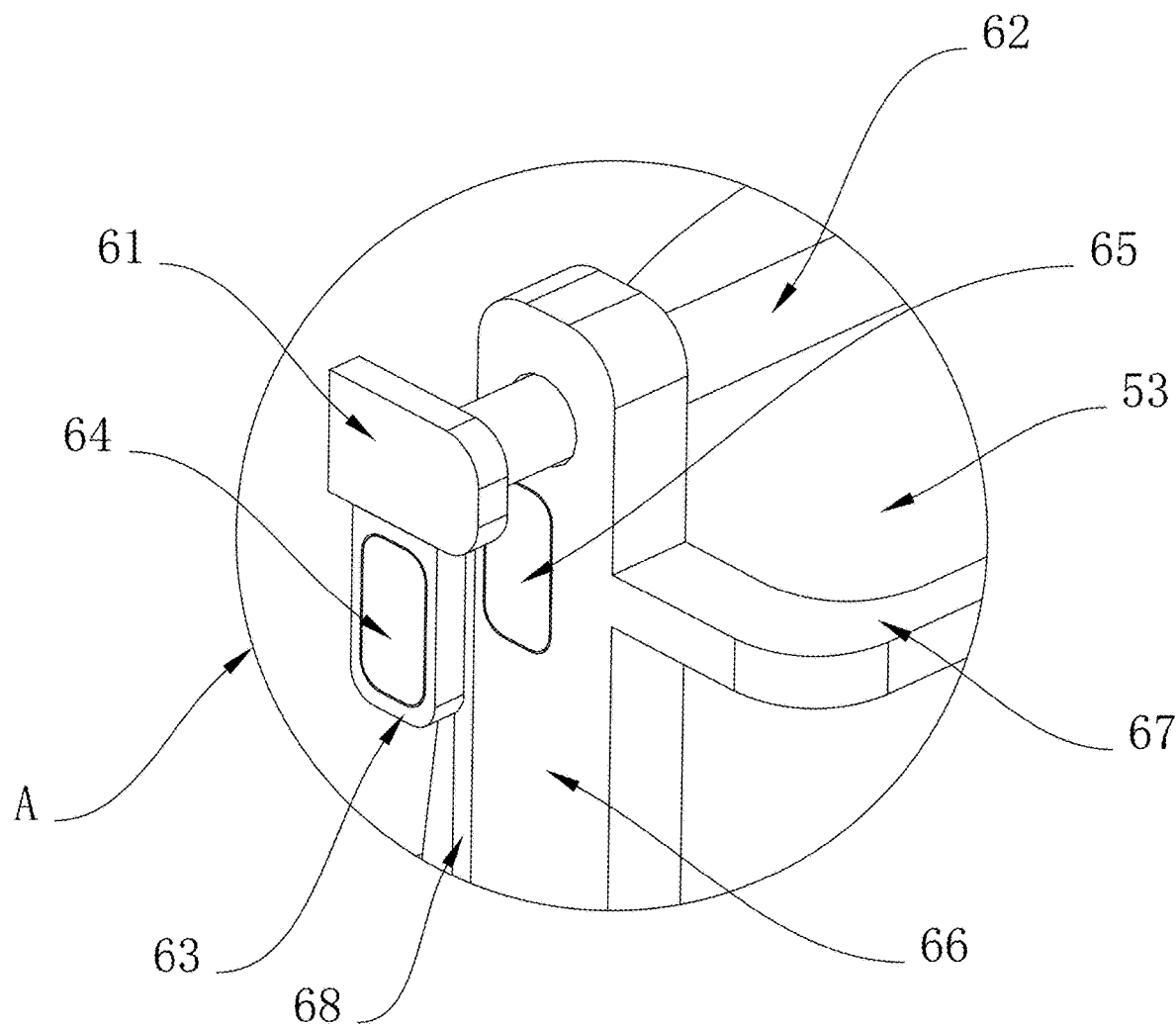
FIG. 2 is a schematic structural diagram of point A in FIG. 1 of the solar water valve with a waterproof structure according to the present disclosure.
Figure 3:
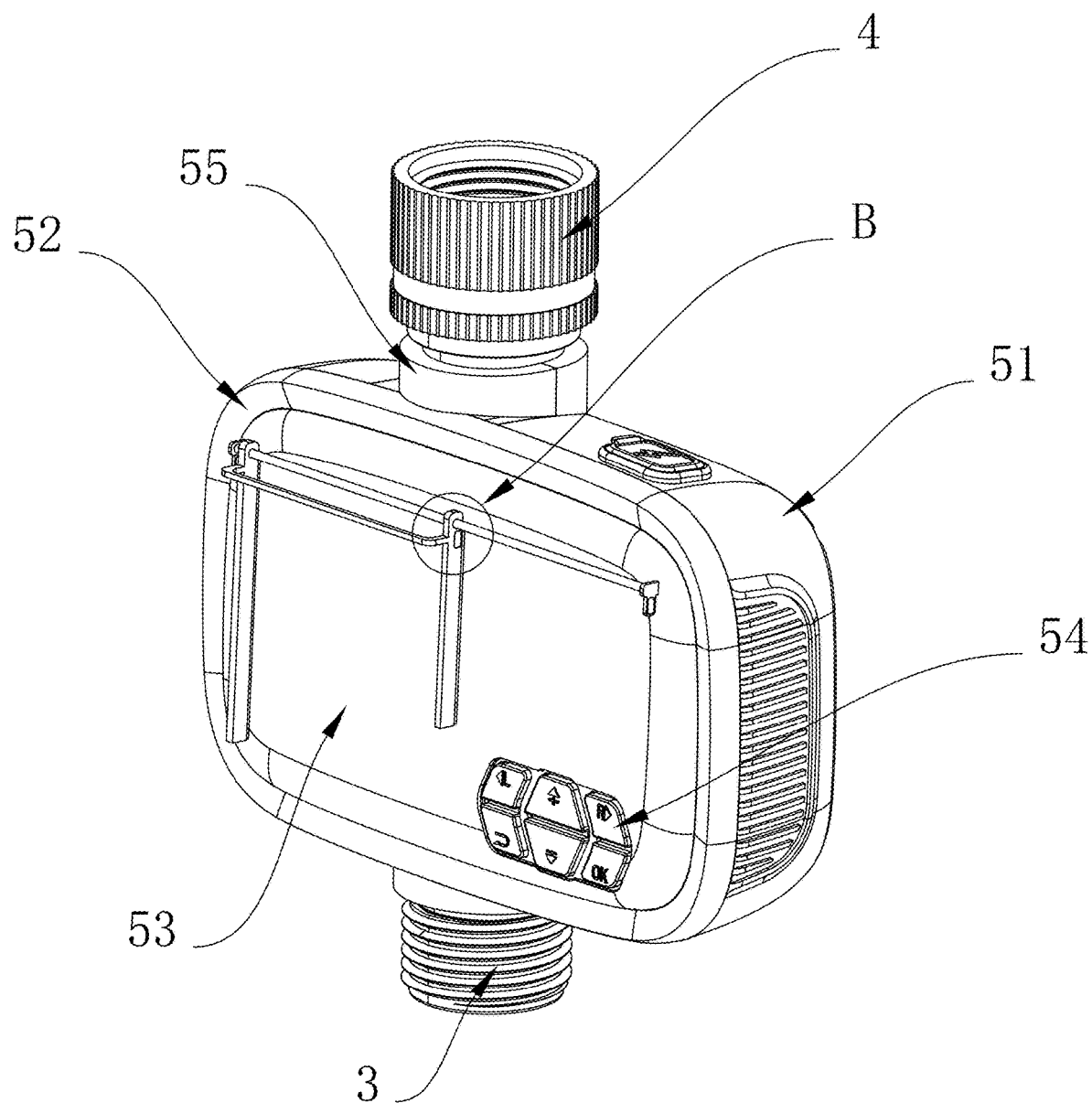
FIG. 3 is a schematic side view of the solar water valve with a waterproof structure according to the present disclosure.
Figure 4:
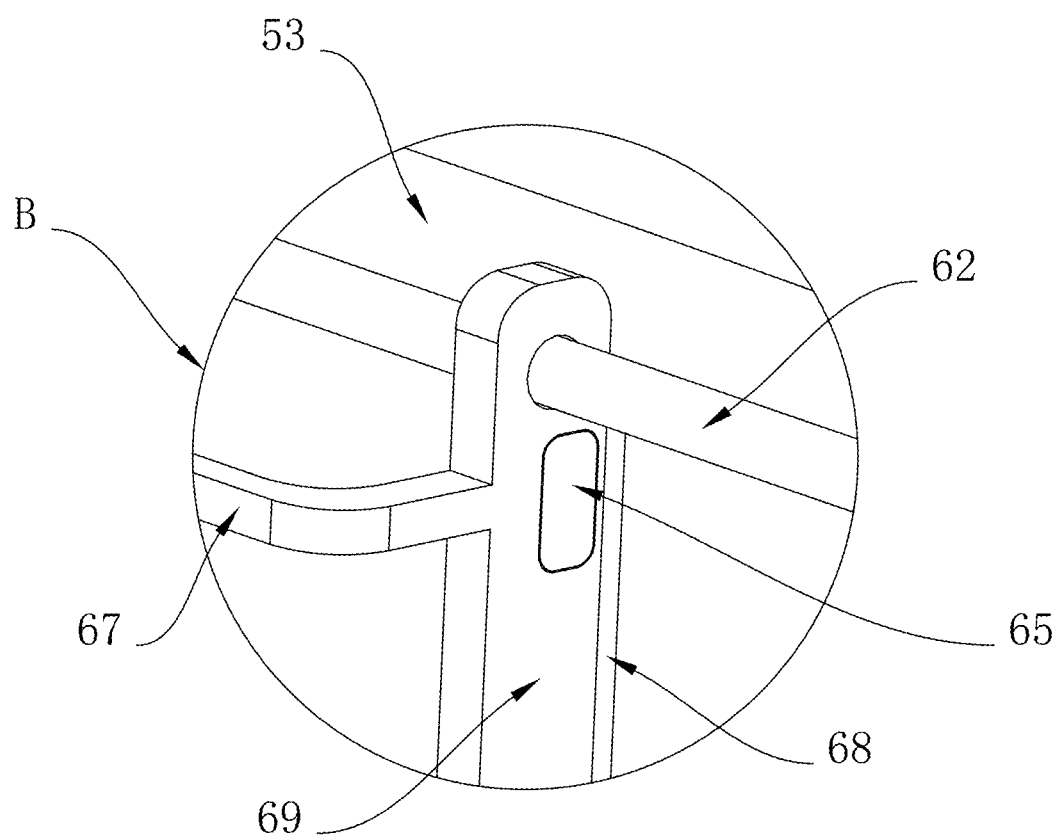
FIG. 4 is a schematic structural diagram of point B in FIG. 2 of the solar water valve with a waterproof structure according to the present disclosure.
Figure 5:
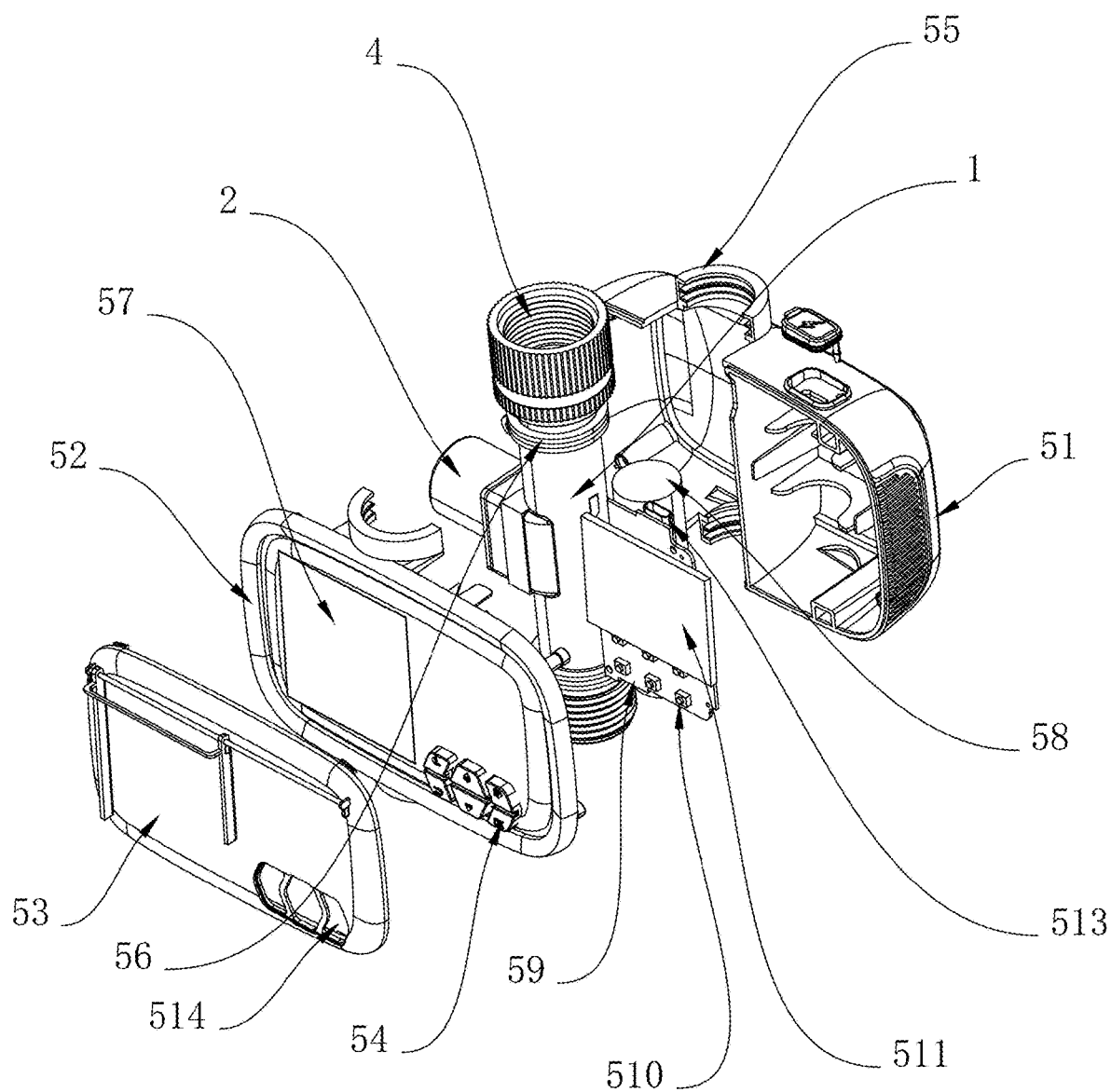
FIG. 5 is a schematic diagram of an explosive structure of the solar water valve with a waterproof structure according to the present disclosure.
Figure 6:
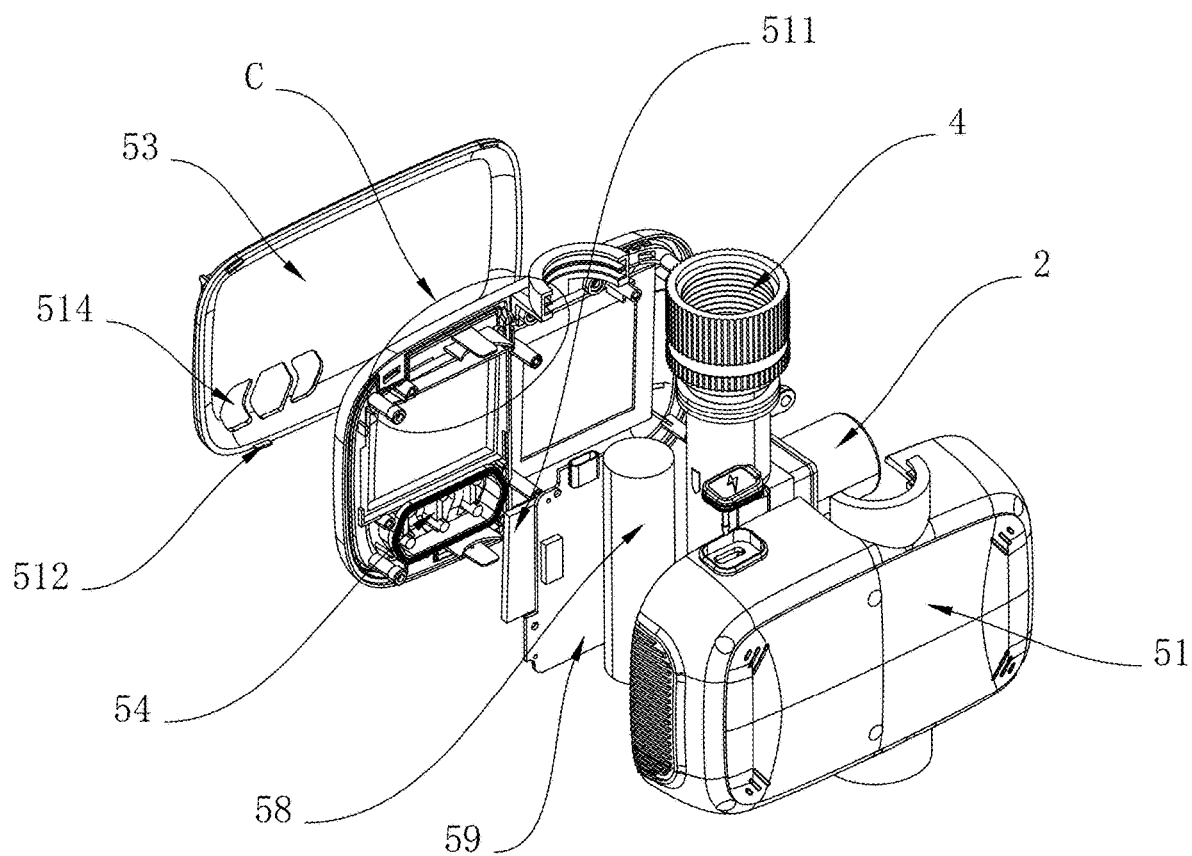
FIG. 6 is a schematic diagram of a side view structure of FIG. 5 in the solar water valve with a waterproof structure according to the present disclosure.
Figure 7:
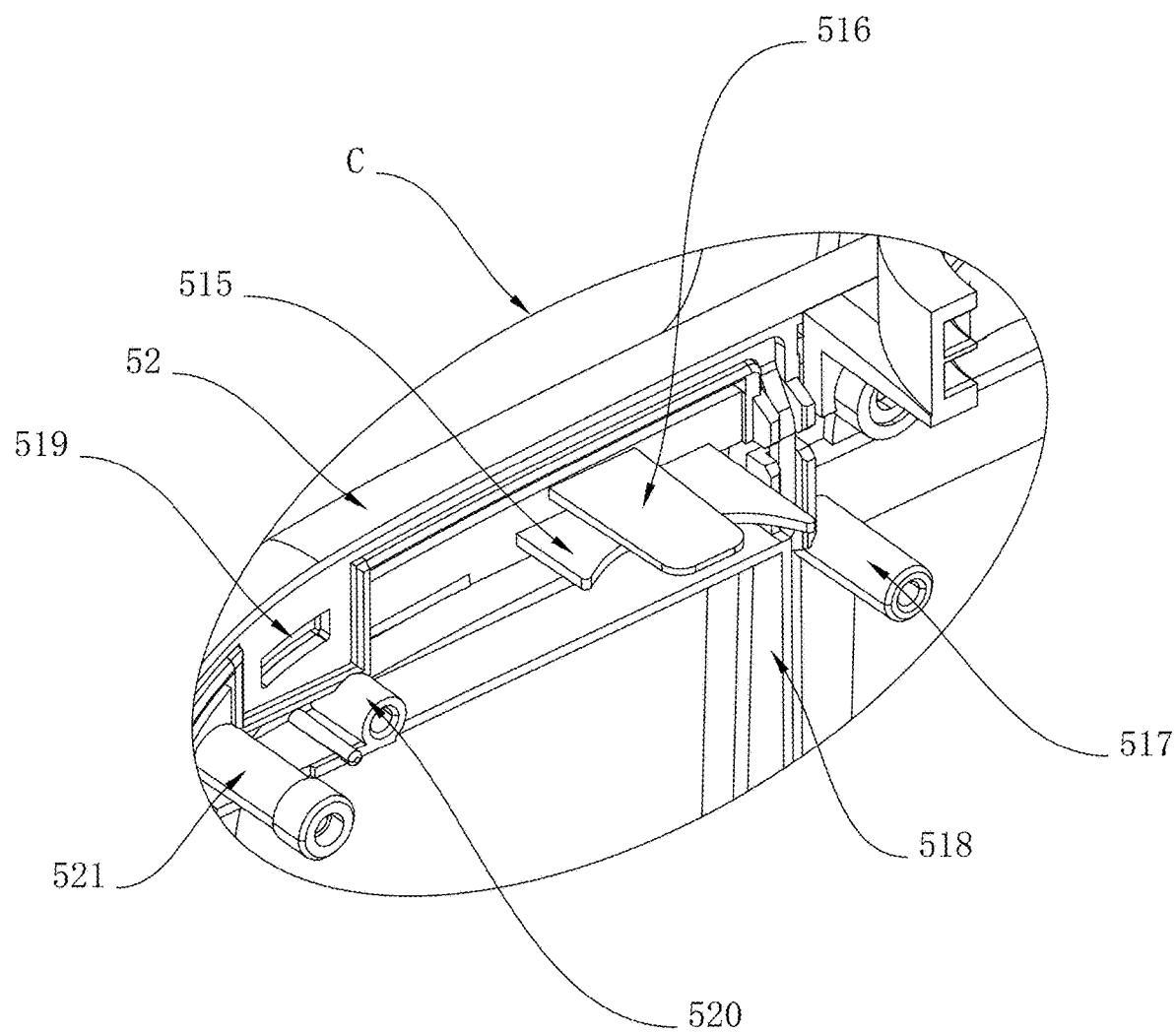
FIG. 7 is a schematic structural diagram of point C in FIG. 6 of the solar water valve with a waterproof structure according to the present disclosure.
Figure 8:
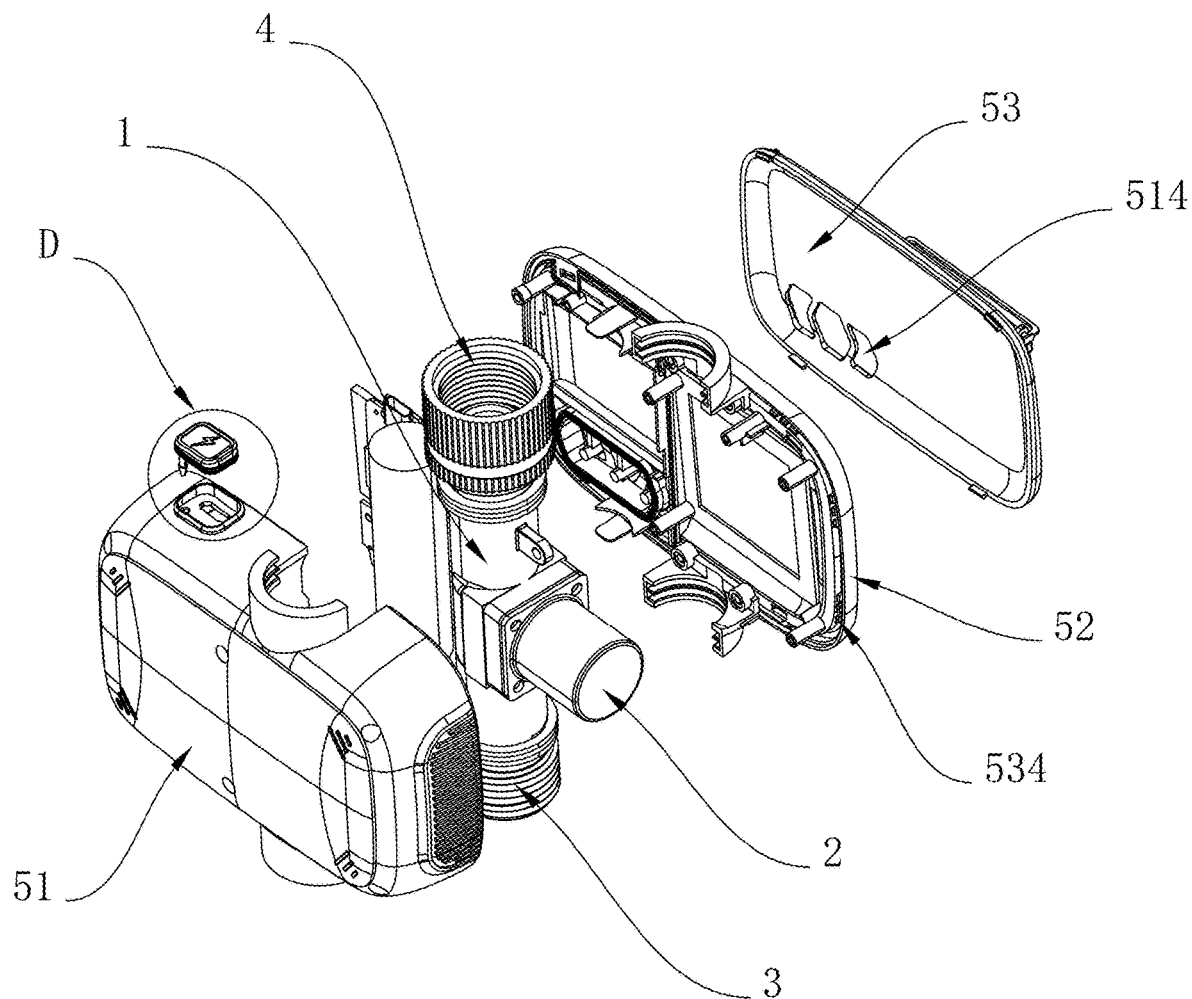
FIG. 8 is a schematic diagram of a side view structure of FIG. 6 in the solar water valve with a waterproof structure according to the present disclosure.
Figure 9:
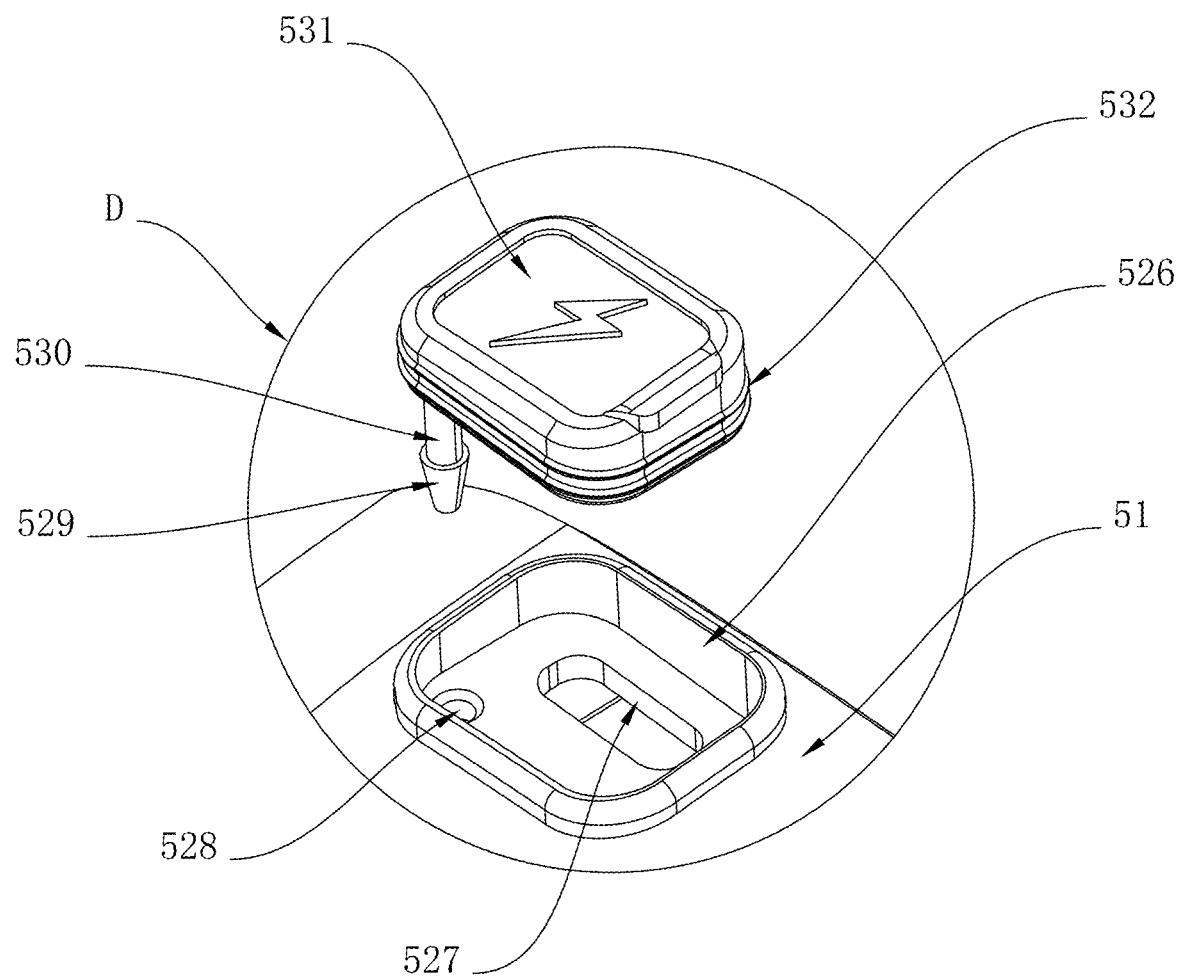
FIG. 9 is a schematic structural diagram of point D in FIG. 8 of the solar water valve with a waterproof structure according to the present disclosure.
Figure 10:
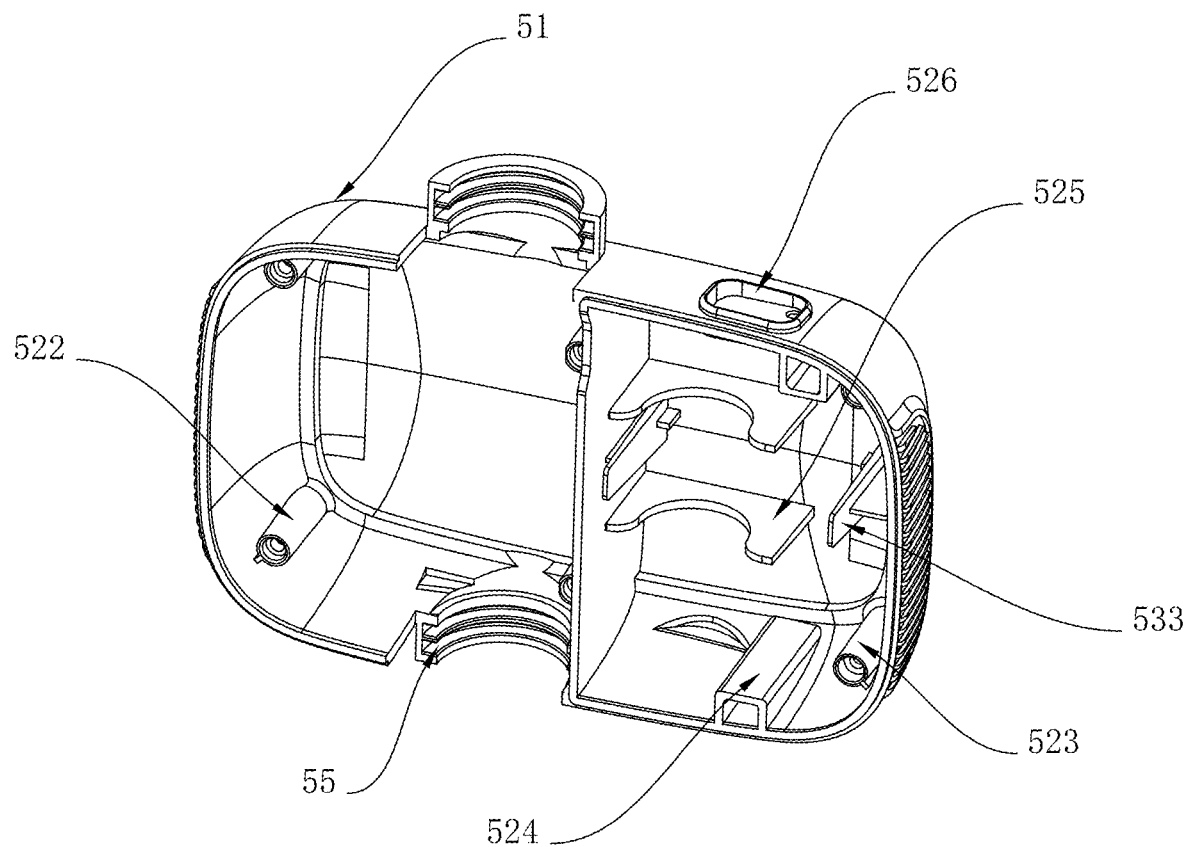
FIG. 10 is a schematic diagram of a protective back cover of the solar water valve with a waterproof structure according to the present disclosure.

A solar water valve with a waterproof structure, as shown in FIGS. 1-10, includes a pipe body 1. An upper end of the pipe body 1 is provided with an installation nut 4, and a lower end of the pipe body 1 is provided with an installation screw mouth 3. One surface of the pipe body 1 is provided with a control valve 2, and the surface of the pipe body 1 is provided with a protective device 5. The protective device 5 includes a protective back cover 51 and a protective front cover 52. Sides of the protective front cover 52 and the protective back cover 51 that are close to each other are fixedly connected with a sealing sleeve 55. The surface of the pipe body 1 is fixedly connected with a sealing ring 56, and the sealing sleeve 55 is fastened on the sealing ring 56. The side of the protective front cover 52 close to the protective back cover 51 is fixedly connected with a clamp block 534, and one end of the clamp block 534 is inserted into the protective back cover 51. An inner wall of the protective front cover 52 is fixedly connected to an installation frame 518, and a display screen 511 is provided in the installation frame 518. One side of the display screen 511 is electrically connected to a circuit board 59. One side of the circuit board 59 away from the display screen 511 is electrically connected to a rechargeable battery 58. A solar panel 57 is provided in the protective front cover 52, and an output end of the solar panel 57 is electrically connected to an input end of the rechargeable battery 58. A driving end of the circuit board 59 is electrically connected to an input end of the control valve 2.

A protective cover plate 53 is provided on one side of the protective front cover 52 away from the protective back cover 51. One surface of the protective cover plate 53 is fixedly connected with a hook 512, and a clamp hole 519 is provided on the surface of the protective front cover 52. One end of the hook 512 away from the protective cover plate 53 is inserted into the clamp hole 519.

A button 54 is provided in the protective front cover 52, and a through hole 514 is provided on the surface of the protective cover plate 53. One end of the button 54 passes through the through hole 514, and a micro switch 510 is electrically connected to one surface of the circuit board 59.

An upper end of the circuit board 59 is electrically connected with a data connector 513, and an upper surface of the protective back cover 51 is fixedly connected with a protective ring 526. One surface of the protective back cover 51 is provided with a positioning hole 527, and one end of the data connector 513 is inserted into the positioning hole 527. A sealing block 531 is inserted into the protective ring 526, which effectively prevents water from entering the data connector 513 through the sealing block 531 and the protective ring 526, thereby ensuring a stable operation of the device.

The working principle of the present disclosure is that the protective front cover and protective back cover 51 are fastened to the sealing ring 56 on the surface of the pipe body 1 through the sealing sleeve 55, thereby forming the first waterproof barrier. The clamp block 534 of the protective front cover 52 is inserted into the protective back cover 51, further enhancing the sealing and structural stability of the protective device 5. The waterproof performance of the data connector 513 is ensured by fixing and sealing the structure through the rubber column 530, the stopper 529, and other structures, The installation frame 518 on an inner wall of the protective front cover 52 is configured to install the display screen 511. The support column 517 is matched with a support sleeve 522 on an inner wall of the protective back cover 51, an installation column 521 is matched with an installation sleeve 523, and a positioning column 520 is matched with an assembly hole on the circuit board 59 to achieve precise installation and fixation of components such as the protective front cover 52, the protective back cover 51, and the circuit board 59. The first limit frame 515 and the second limit frame 525 fix the rechargeable battery 58, and baffles 516 are inserted into a limit sleeve 524 to ensure that the internal components are stably placed inside the protective device 5.

Finally, it should be noted that the above description is only preferred embodiments of the present disclosure and is not intended to limit the present disclosure. Although the present disclosure has been described in detail with reference to the aforementioned embodiments, those skilled in the art can still modify the technical solutions described in the aforementioned embodiments or equivalently replace some of the technical features. Any modifications, equivalent replacements, improvements, etc. made within the spirit and principles of the present disclosure should be included in the protection scope of the present disclosure.

What is claimed is:

1. A solar water valve with a waterproof structure, comprising a pipe body, wherein an upper end of the pipe body is provided with an installation nut, a lower end of the pipe body is provided with an installation screw mouth, one surface of the pipe body is provided with a control valve and a protective device, the protective device comprises a protective back cover and a protective front cover;

sides of the protective front cover and the protective back cover that are close to each other are both fixedly connected with a sealing sleeve, and the surface of the pipe body is fixedly connected to a sealing ring, and the sealing sleeve is fastened on the sealing ring;

one side of the protective front cover close to the protective back cover is fixedly connected with a clamp block, and one side of the clamp block is inserted into the protective back cover, and an installation frame is fixedly connected to an inner wall of the protective front cover;

a display screen is provided in the installation frame;

one side of the display screen is electrically connected to a circuit board, and one side of the circuit board away from the display screen is electrically connected to a rechargeable battery;

a solar panel is provided in the protective front cover, and an output end of the solar panel is electrically connected to an input end of the rechargeable battery;

a driving end of the circuit board is electrically connected to an input end of the control valve.

2. The solar water valve with a waterproof structure according to claim 1, wherein a protective cover plate is provided on one side of the protective front cover away from the protective back cover, and a hook is fixedly connected to one surface of the protective cover plate; the surface of the protective front cover is provided with a clamp hole, and one side of the hook away from the protective cover plate is inserted into the clamp hole.

3. The solar water valve with a waterproof structure according to claim 2, wherein a button is provided in the protective front cover, a through hole is provided on the surface of the protective cover plate, one end of the button passes through the through hole, and a micro switch is electrically connected to one surface of the circuit board, and the micro switch is located on a movement trajectory of the button.

4. The solar water valve with a waterproof structure according to claim 2, wherein one surface of the protective cover plate is provided with a cleaning device, and the cleaning device comprises a support block, the support block is fixedly connected to one surface of the protective cover plate, there are two support blocks;

sides of the two support blocks that are close to each other are fixedly connected to a sliding rod, and the sliding rod is slidably connected to a first load rod, the sliding rod is slidably connected to a second load rod;

sides of the first load rod and the second load rod that are away from the protective cover plate are fixedly connected to a pull rod;

sides of the first load rod and the second load rod that are close to the protective cover plate are both fixedly connected with a cleaning strip.

5. The solar water valve with a waterproof structure according to claim 1, wherein a data connector is electrically connected to an upper end of the circuit board, a protective ring is fixedly connected to an upper surface of the protective back cover, a positioning hole is provided on one surface of the protective back cover, one end of the data connector is inserted into the positioning hole, and a sealing block is inserted into the protective ring.

6. The solar water valve with a waterproof structure according to claim 5, wherein a storage hole is provided on one surface of the protective back cover, and a rubber column is inserted into the storage hole; one end of the rubber column is fixedly connected to one surface of the sealing block, and a stopper is fixedly connected to one end of the rubber column away from the sealing block;

a sealing ring is provided on one surface of the sealing block.

7. The solar water valve with a waterproof structure according to claim 5, wherein the stopper is conical in shape, and a diameter of one end of the stopper close to the rubber column is larger than an inner diameter of the storage hole.

8. The solar water valve with a waterproof structure according to claim 1, wherein an inner wall of the protective front cover is fixedly connected to a support column, an inner wall of the protective back cover is provided with a support sleeve adapted to the support column, an inner wall of the protective front cover is fixedly connected to an installation column, an inner wall of the protective back cover is provided with an installation sleeve adapted to the installation column, an inner wall of the protective front cover is fixedly connected to a positioning column, and the circuit board is provided with an assembly hole that is adapted to the positioning column.

9. The solar water valve with a waterproof structure according to claim 1, wherein an inner wall of the protective front cover is fixedly connected to a first limit frame, an inner wall of the protective back cover is fixedly connected to a second limit frame, the rechargeable battery is located between the first limit frame and the second limit frame;

an inner wall of the protective front cover is fixedly connected to two baffles that are symmetrically arranged, an inner wall of the protective back cover is fixedly connected to a limit sleeve, and ends of the baffles are inserted into the limit sleeve; an inner wall of the protective back cover is fixedly connected to a support plate.

* * * * *